. United States Patent
John et al.

(10) Patent No.: US 9,578,548 B2
(45) Date of Patent: Feb. 21, 2017

(54) SYSTEM AND METHOD FOR CONFIGURING MULTIPLE IP CONNECTIONS

(71) Applicant: FutureWei Technologies, Inc., Plano, TX (US)

(72) Inventors: Kaippallimalil Mathew John, Richardson, TX (US); Marco Spini, Turin (IT)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 685 days.

(21) Appl. No.: 13/924,293

(22) Filed: Jun. 21, 2013

(65) Prior Publication Data

US 2013/0343304 A1 Dec. 26, 2013

Related U.S. Application Data

(60) Provisional application No. 61/663,352, filed on Jun. 22, 2012, provisional application No. 61/698,277, filed on Sep. 7, 2012.

(51) Int. Cl.
*H04W 28/18* (2009.01)
*H04W 12/06* (2009.01)
(Continued)

(52) U.S. Cl.
CPC .............. *H04W 28/18* (2013.01); *H04L 69/24* (2013.01); *H04W 12/06* (2013.01); *H04W 92/10* (2013.01)

(58) Field of Classification Search
CPC ................................................... H04W 28/18
See application file for complete search history.

(56) References Cited

U.S. PATENT DOCUMENTS 7,962,123 B1 * 6/2011 Yegani ................ G06Q 20/102
370/328
2005/0078824 A1 * 4/2005 Malinen ................. H04L 63/08
380/247

(Continued)

FOREIGN PATENT DOCUMENTS

CN 1859445 A 11/2006
CN 101304319 A 11/2008

OTHER PUBLICATIONS

PCT International Search Report and Written Opinion for PCT/CN2013/077760, Applicant: Huawei Technologies Co., Ltd., mailed Sep. 26, 2013, 10 pages.
Valmikam, et al., "EAP Attributes for WiFi—EPC Integration draft-ietf-netext-wifi-epc-eap-attributes-00," IETF Trust, Apr. 23, 2012, 12 pages.

(Continued)

*Primary Examiner* — Hassan Kizou
*Assistant Examiner* — Abdullahi Ahmed
(74) *Attorney, Agent, or Firm* — Slater Matsil, LLP

(57) ABSTRACT

In one embodiment, a method of configuring multiple per user access connections includes receiving, by an access gateway (AG) from an access point (AP), a first extensible authentication protocol (EAP) message including a first capability of a user equipment (UE) and transmitting, by the AG to an authentication, authorization and accounting (AAA) server, a second EAP message including the first capability of the UE and indication second capability of the AG. The method also includes receiving, by the AG from the AAA server, and an AAA message including a negotiated connection capability version and AAA message parameters and transmitting, by AG to the AP, a third EAP message including the negotiated connection capability version.

21 Claims, 13 Drawing Sheets

(51) Int. Cl.
*H04L 29/06* (2006.01)
*H04W 92/10* (2009.01)

(56) References Cited

U.S. PATENT DOCUMENTS

| | | | | |
|---|---|---|---|---|
| 2008/0311906 | A1 | 12/2008 | Suh et al. | |
| 2009/0328147 | A1* | 12/2009 | Goel | H04L 63/08 726/3 |
| 2010/0035578 | A1* | 2/2010 | Ahmed | H04W 12/06 455/411 |
| 2011/0019592 | A1* | 1/2011 | Taaghol | H04L 63/0823 370/259 |
| 2011/0154454 | A1 | 6/2011 | Frelechoux | |
| 2013/0121322 | A1* | 5/2013 | Salkintzis | H04W 76/022 370/338 |
| 2013/0265985 | A1* | 10/2013 | Salkintzis | H04W 76/022 370/331 |
| 2013/0308531 | A1* | 11/2013 | So | H04W 76/022 370/328 |
| 2014/0321328 | A1* | 10/2014 | Zuniga | H04W 8/06 370/254 |
| 2015/0016418 | A1* | 1/2015 | Thiebaut | H04L 63/0892 370/331 |

OTHER PUBLICATIONS

3rd Generation Partnership Project; Technical Specification Group Services and System Aspects; Study on S2a Mobility based on GTP & WLAN access to EPC (SaMOG); Stage 2 (Release 12), 3GPP TR 23.852 V1.2.0 (Jul. 2012), Section 8.2, 63 pages.
3rd Generation Partnership Project; Technical Specification Group Services and System Aspects; Network Architecture (Release 11) 3GPP TS 23.002 V11.1.0 (Dec. 2011), 96 pages.
3rd Generation Partnership Project; Technical Specification Group Services and System Aspects; General Packet Radio Service (GRPS) Enhancements for Evolved Universal Terrestrial Radio Access Network (E-UTRAN) access (Release 11), 3GPP TS 23.401 V11.2.0 (Jun. 2012), 285 pages.
3rd Generation Partnership Project; Technical Specification Group Services and System Aspects; Architecture Enhancements for non-3GPP Accesses (Release 11), 3GPP TS 23.402 V11.2.0 (Mar. 2012), 251 pages.
Arkko, J., et al., "Extensible Authentication Protocol Method for 3rd Generation Authentication and Key Agreement (EAP-AKA)," IETF RFC 4187 Jan. 2006, 79 pages.
Wi-Fi Alliance Technical Committee, Hotspot 2.0 Technical Task Group, Hotspot 2.0 (Release 2) Technical Specification Version 1.03, Jun. 18, 2012, 137 pages.

* cited by examiner

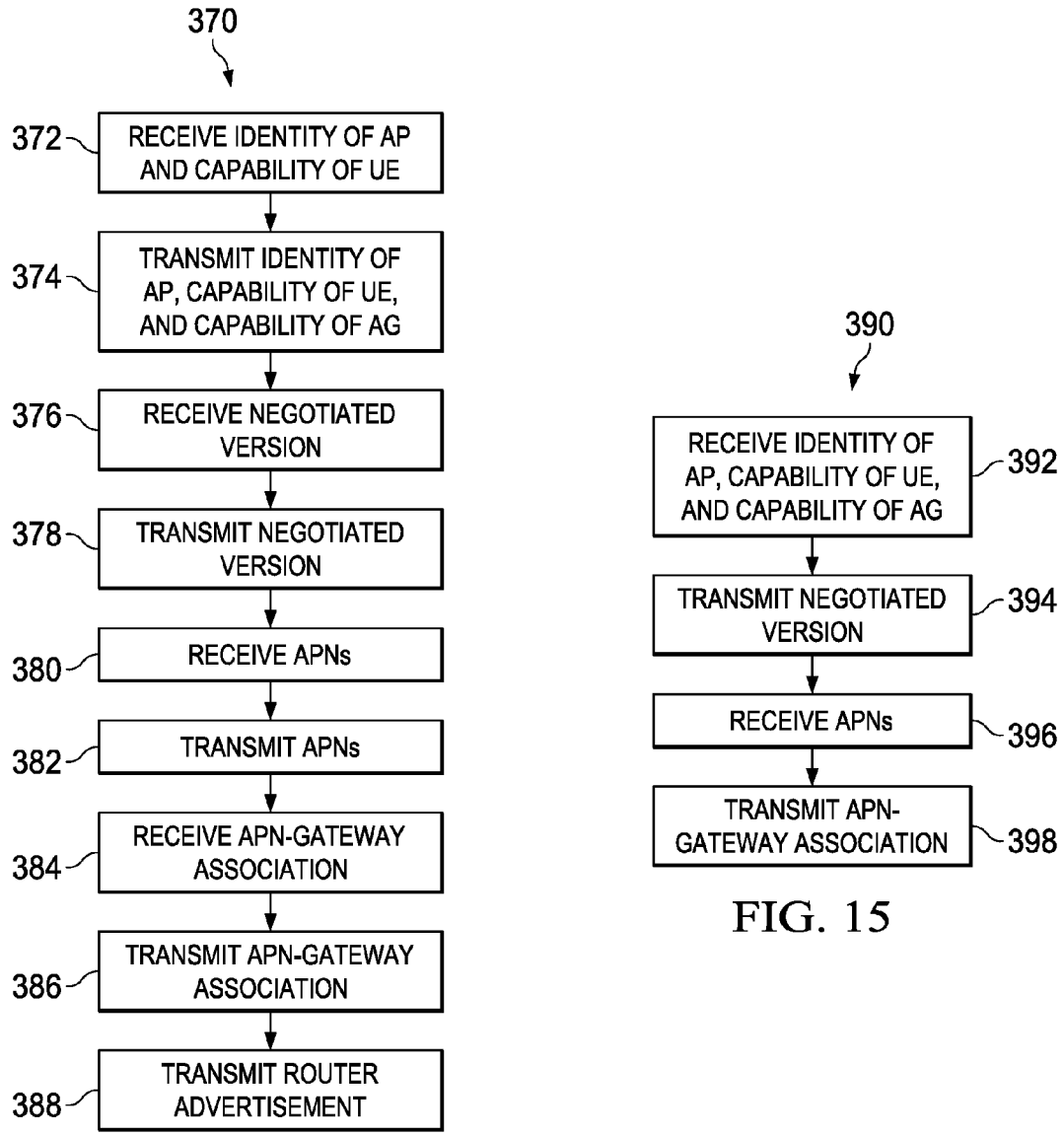

SYSTEM AND METHOD FOR CONFIGURING MULTIPLE IP CONNECTIONS

This application claims the benefit of U.S. Provisional Application Ser. No. 61/663,352 filed on Jun. 22, 2012, and entitled "System and Method for Configuring Multiple Connections Using Extensible Authentication Protocol," and of U.S. Provisional Application Ser. No. 61/698,277 filed on Sep. 7, 2012, and entitled "System and Method for Multiple IP Interfaces Over a Single Link," which applications are hereby incorporated herein by reference.

TECHNICAL FIELD

The present invention relates to a system and method for wireless communications, and, in particular, to a system and method for configuring multiple internet protocol (IP) connections.

BACKGROUND

In a $3^{rd}$ Generation Partnership Project (3GPP), there is a connection oriented access to multiplex several packet data network (PDN) connections over a single physical radio interface. A default PDN connection is set up during the initial attachment of a user equipment (UE). Additional connections to PDNs may be initiated based on the access point name (APN) for a corresponding application. Each PDN connection has a connection setup from the UE to the PDN. Some UE operating systems, such as Symbian, treat each different PDN as a virtual node inside the UE. Other UE operating systems, such as Android, use traditional IP routing tables with a policy driven layer on top. The policy layer decides the route and preferences for each application.

SUMMARY

An embodiment method of configuring multiple per user access connections includes receiving, by an access gateway (AG) from an access point (AP), a first extensible authentication protocol (EAP) message including a first capability of a user equipment (UE) and transmitting, by the AG to an authentication, authorization and accounting (AAA) server, a second EAP message including the first capability of the UE and indication second capability of the AG. The method also includes receiving, by the AG from the AAA server, and a first AAA message including a negotiated connection capability version and AAA message parameters and transmitting, by AG to the AP, a third EAP message including the negotiated connection capability version.

An embodiment method of configuring multiple per user connections includes transmitting, by a user equipment (UE) to an access point (AP), a first extensible authentication protocol (EAP) message destined for an AG, where the first EAP message includes a first plurality of access point names (APNs) and receiving, by the UE from the AP, a second EAP message including an association between the first plurality of APNs and a second plurality of gateway interfaces. The method also includes determining a third plurality of router interface addresses in accordance with the second EAP message.

An embodiment access gateway (AG) includes a processor and a computer readable storage medium storing programming for execution by the processor. The programming includes instructions to receive, from an access point (AP), a first extensible authentication protocol (EAP) message including a first capability of a user equipment (UE) and transmit, to an authentication, authorization and accounting (AAA) server, a second EAP message including the first capability of the UE and indication second capability of the AG. The programming also includes instructions to receive, from the AAA server, and an AAA message including a negotiated connection capability version and AAA message parameters and transmit, to the AP, a third EAP message including the negotiated connection capability version.

An embodiment user equipment (UE) includes a processor and a computer readable storage medium storing programming for execution by the processor. The programming including instructions to transmit, to an access point (AP), a first extensible authentication protocol (EAP) message destined for an AG, where the first EAP message includes a first plurality of access point names (APNs) and receive, from the AP, a second EAP message including an association between the first plurality of APNs and a second plurality of gateway interfaces. The programming also includes instructions to determine a third plurality of router interface addresses in accordance with the second EAP message.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 14 illustrates an additional flowchart for an embodiment method of connecting multiple IP interfaces;

FIG. 15 illustrates another flowchart for an embodiment method of connecting multiple IP interfaces.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a trusted access network, there may be no need for tunneled connections when it is possible to differentiate virtual internet protocol (IP) interfaces to $3^{rd}$ Generation Partnership Project (3GPP) packet data networks (PDNs). Avoiding tunnels may make the packets more transparent and save radio access bandwidth for applications such as voice over IP (VoIP) that send a number of small delay sensitive packets.

Access to 3GPP enhanced packet core (EPC) is supported over networks, such as wireless local area networks (WLAN), using dual stack implementation of mobile IP (SSMIP) (referred to as S2c in 3GPP specifications) or internet key exchange internet protocol security (IKE/IPSec) (referred to S2b in 3GPP specifications) to provide a connection-oriented interface that corresponds to a 3GPP PDN. In 3GPPP Release 11, only connections to a single PDN are supported. It is desirable to support more than one PDN connection to enhance some parity between 3GPP and WLAN access in terms of the connection service model.

Native 3GPP access networks support multiple PDNs, and have the ability for a session to be handed over as a user moves out of one access network to another. The requirement for session continuity is relaxed, and does not require stringent handover delays. However, IP address preservation is required as the user moves from on access gateway to another. In 3GPP Release 11, there is support for non-seamless WLAN offload (NSWO), which enables an operator to offload a user's connection to an external IP network without traversing the 3GPP EPC. In an example, a multiple PDN model supports an NSWO connection, while other connections terminate at a PDN in the EPC.

IP layer services that may be supported include IP version 4 (IPv4) and IP version 6 (IPv6). In IPv4, addresses may be private. When IP addresses are private, a user equipment (UE) may have overlapping addresses configured from different PDNs. Also, some 3GPP networks have multicast servers with private addresses.

In 3GPP networks, UEs can set up multiple PDN connections and attach to multiple access point networks (APNs) simultaneously. For example, a UE may attach to an APN for IP multimedia subsystem (IMS), and another for internet access. Non-access stratum (NAS) signaling below IP may be used to convey connection information.

Figure 1:
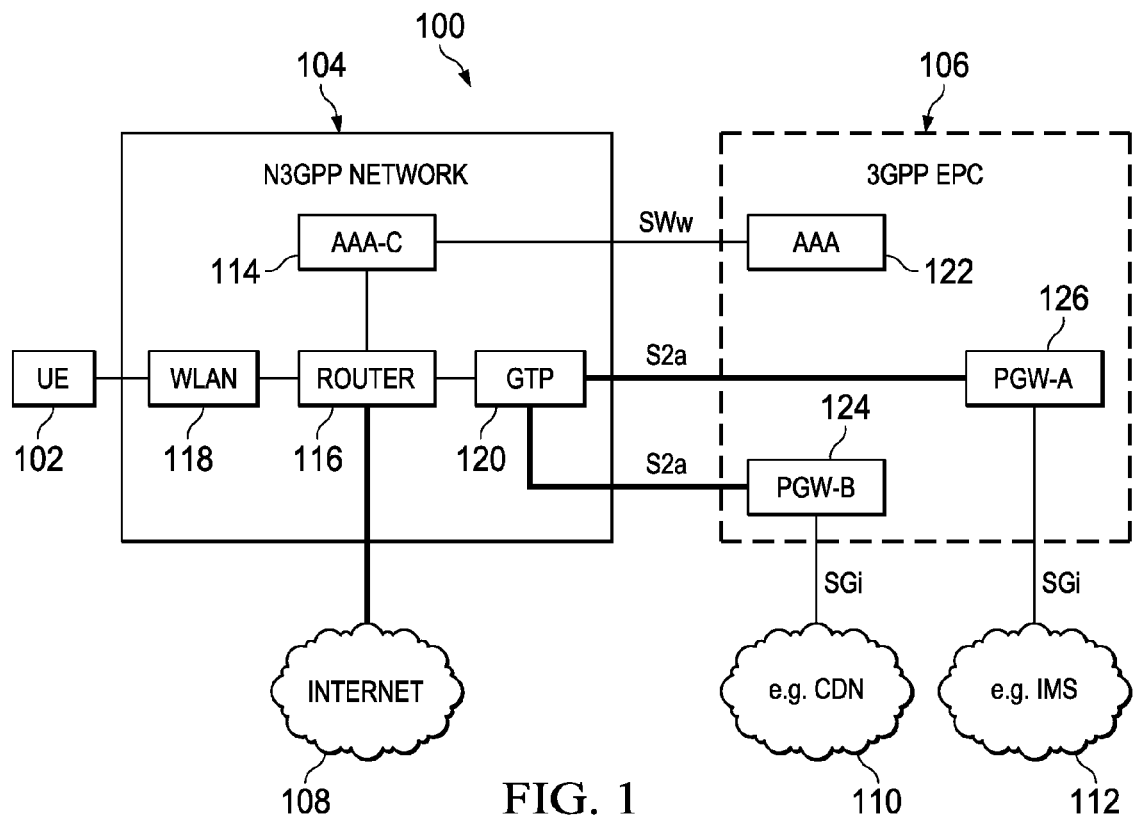
FIG. 1 illustrates an embodiment network for connecting multiple internet protocol (IP) connections.

A non-3GPP (N3GPP) access network, such as WLAN or Worldwide Interoperability Microwave Access (WiMAX), may attach to a 3GPP EPC network. FIG. 1 illustrates network 100, where N3GPP network 104 is coupled to 3GPP EPC 106. UE 102, coupled to N3GPP network 104, accesses internet 108 through N3GPP network 104, content delivery network (CDN) 110 through 3GPP EPC 106, and IMS 112 through 3GPP EPC 106.

UE 102 connects to WLAN 118 in N3GPP network 104. From WLAN 118 through router 116, UE 102 connects to internet 108. Also, UE 102 connects to 3GPP EPC 106 through general packet radio service (GPRS) tunneling protocol (GTP) 120.

To connect to 3GPP EPC 106, UE 102 uses authentication, authorization, and accounting (AAA) 122 in 3GPP EPC 106 through AAA control (AAA-C) 114. After authentication, AAA 122, or a home subscriber server (HSS) (not pictured) provides parameters to UE 102, such as an access point name (APN) list. Then, UE 102 may connect to the network of choice by sending router solicitation and obtaining an IP prefix. In network 100, UE 102 may connect to CDN 110 through packet data network gateway (PGW)-B 124 or to IMS 112 through PGW-A 126. When the network of choice is N3GPP network 104, traffic is routed through router 116 to internet 108 through N3GPP network 104 bypassing 3GPP EPC 106. While router 116 in N3GPP network 104 obtains the list of APNs allowed for UE 102, UE 102 does not communicate its network preference to router 116.

Figure 2:
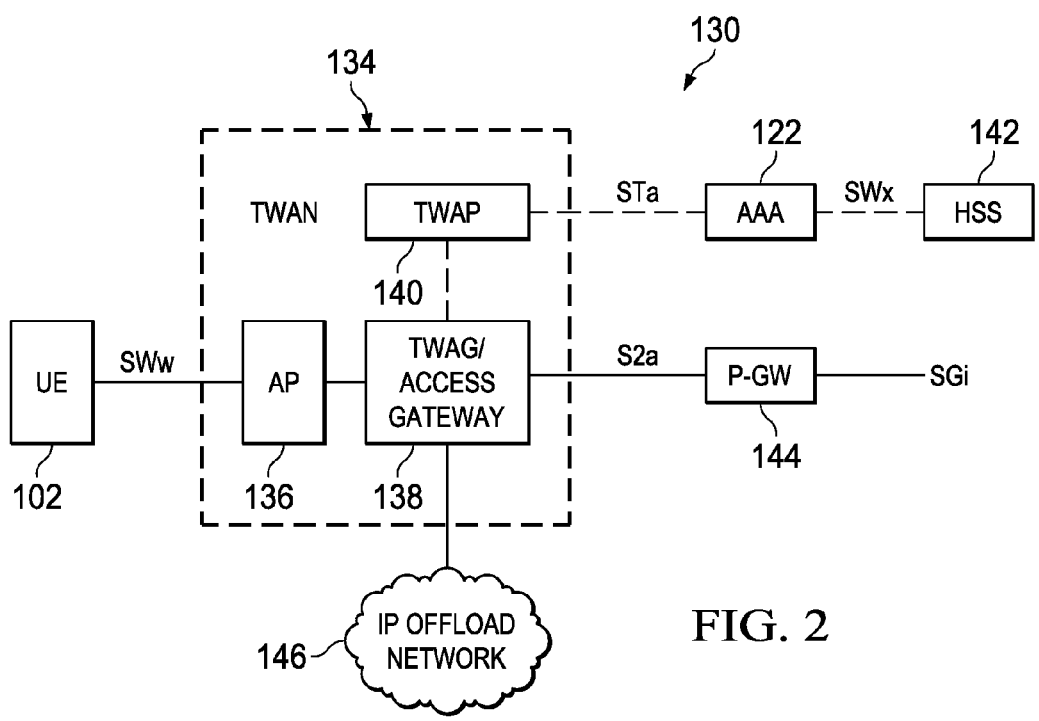
FIG. 2 illustrates another embodiment network for connecting multiple IP connections.

FIG. 2 illustrates N3GPP access network 130. In N3GPP access network 130, UE 102 attaches to PGW 144, an EPC, through trusted wireless access network (TWAN) 134. To attach to PGW 144, UE 102 connects to access point (AP) 136, then to access gateway (AG) 138. In an example, AG 138 is a Trusted Wireless AG (TWAG). In this example, AG 138 is the first hop router for UE 102. In an example, AG 138 behaves as a proxy mobile IP (PMIP) Mobile Access Gateway (MAG) to obtain IP addresses from PGW 144, which behaves as a PMIP Local Mobility Anchor (LMA). In this example, there is no mechanism for UE 102 to signal the APN or PDN connection to AG 138. UE 102 may also connect to IP offload network 146 through AG 138.

Extensible Authentication Protocol (EAP) transports authentication key agreement (AKA) messages between a UE and AAA servers. In an example, AG 138 is connected to AAA 122, and then to HSS 142, through trusted wireless AP (TWAP) 140. In one example, AG 138 and TWAP 140 are combined in a single access gateway. In this example, EAP signaling is used for multiple 3GPP APNs. EAP is used as a transport mechanism to carry PDN connection parameters between UE 102 and AG 138 following UE authentication. In an example, existing EAP codes are used, and only a new protocol to convey the connection parameters is used.

In one embodiment, an EAP solution extends to use a sub-protocol that enables multiple PDN connections. Connections may be initiated by UE 102 at any time after authentication. An EAP proxy function is inserted into AG 138. The EAP proxy forwards EAP messages from UE 102 containing APN signaling to a connection manager (CM).

Figure 3:
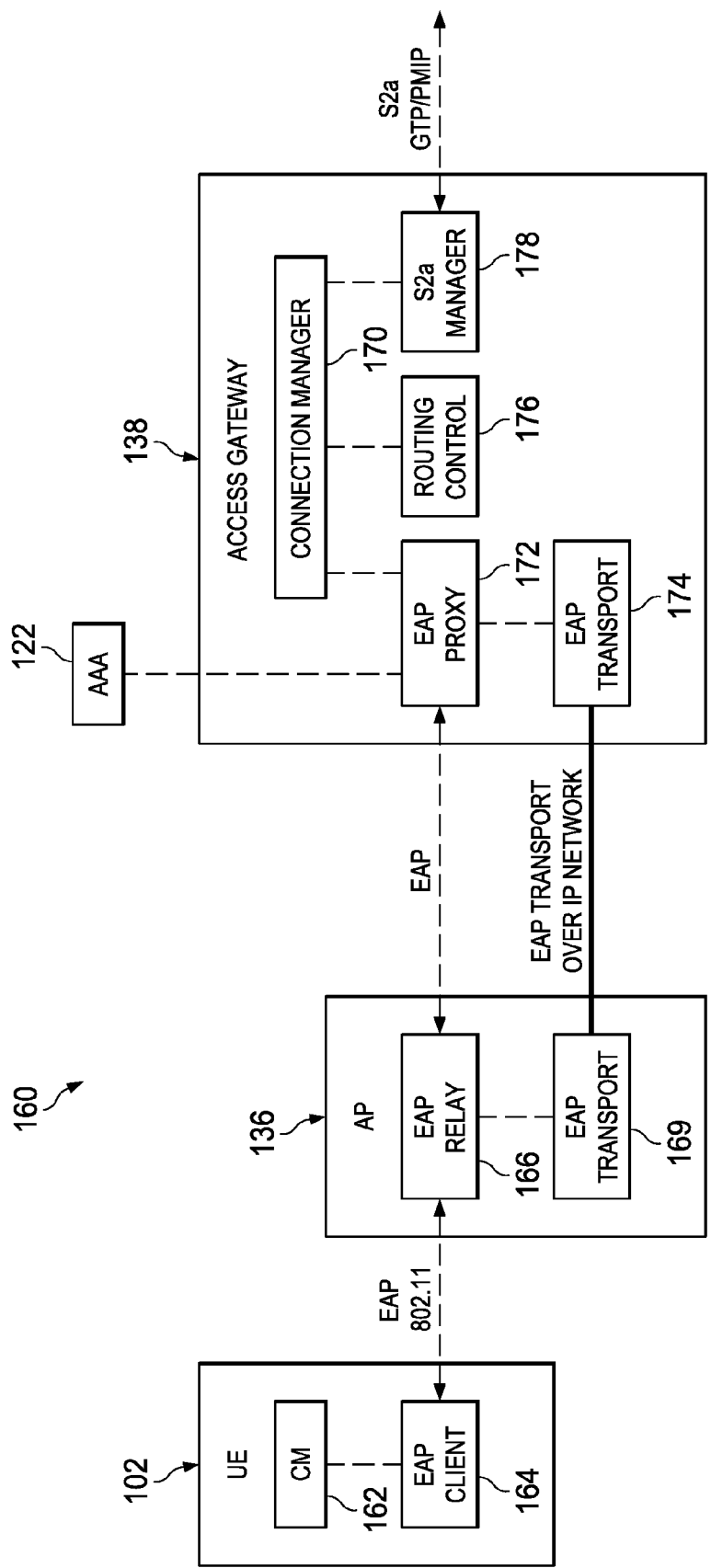
FIG. 3 illustrates another embodiment network for connecting multiple IP connections.

FIG. 3 illustrates network 160, where a 3GPP UE may attach to multiple APNs over a trusted N3GPP access network, such as a WLAN. UE 102, AP 136, AG 138, and AAA 122 communicate APN and PDN connection parameters. EAP messages are sent from UE 102 to AG 138 through AP 136. The EAP messages used may be EAP over wireless (EAPoW), remote authentication dial in user service (RADIUS), control and provisioning of wireless access point (CAPWAP), diameter, or another form of messages. Connection manager 162 in UE 102 triggers a request for a PDN connection. This request is processed by EAP client 164 in UE 102, which transmits the request to AP 136.

The request from EAP client 164 transmitted EAP relay 166 in AP 136, which transmit EAP messages to EAP proxy 172 in AG 138. In one example, EAP transport 169 in AP 136 transmits EAP messages over an IP network, such as RADIUS or CAPWAP.

Also, EAP transport 174 receives EAP messages from EAP transport 169, and forwards them to EAP proxy 172. EAP proxy 172 determines where to forward the received EAP messages. For authentication procedures, such as AKA and AKA', EAP proxy 172 forwards the messages to AAA 122 based on a network access identifier (NAI). For access context protocol (ACP) used for signaling PDN connection parameters, EAP proxy 172 examines the destination address. When EAP proxy 172 determines that the intended destination is AG 138, EAP proxy 172 forwards the message to connection manager 170. Connection manager 170 uses the parameters in the ACP to request S2a Manager 178 to setup an S2a connection. When EAP proxy 172 determines that the message is not indented for AAA 122 or for AG 138, where the EAP proxy 172 is located, a reply is transmitted to AP 136 with an error message indicating that the destination is not correct, and causing an interruption of the process.

When AG 138 receives S2a connection setup parameters form a PDN gateway (GW) (not pictures), S2a manager 178 sets up the S2a connection, and forwards the allocated IPv6 prefix, in case of an IPv6 PDN connection, to connection manager 170. Then, connection manager 170 requests that routing control 176 send router advertisements from the virtual link local address advertising the IPv6 prefix assigned to UE 102. Connection manager 162 in UE 102 then associates the received router advertisement and IPv6 prefix to the APN that has been requested. Network 160 may both set up and tear down PDN connections between UE 102 and AG 138.

In an example, a mechanism for association PDN and APN is performed over a single layer 2 media access control (MAC) link. An embodiment uses an IP interface in the access network without using tunnels. IPv4 may be configured statefully, while IPv6 is configured statelessly. Unicast and multicast packets may be unambiguously routed for each context. Connections may be independently monitored and released.

Figure 4:
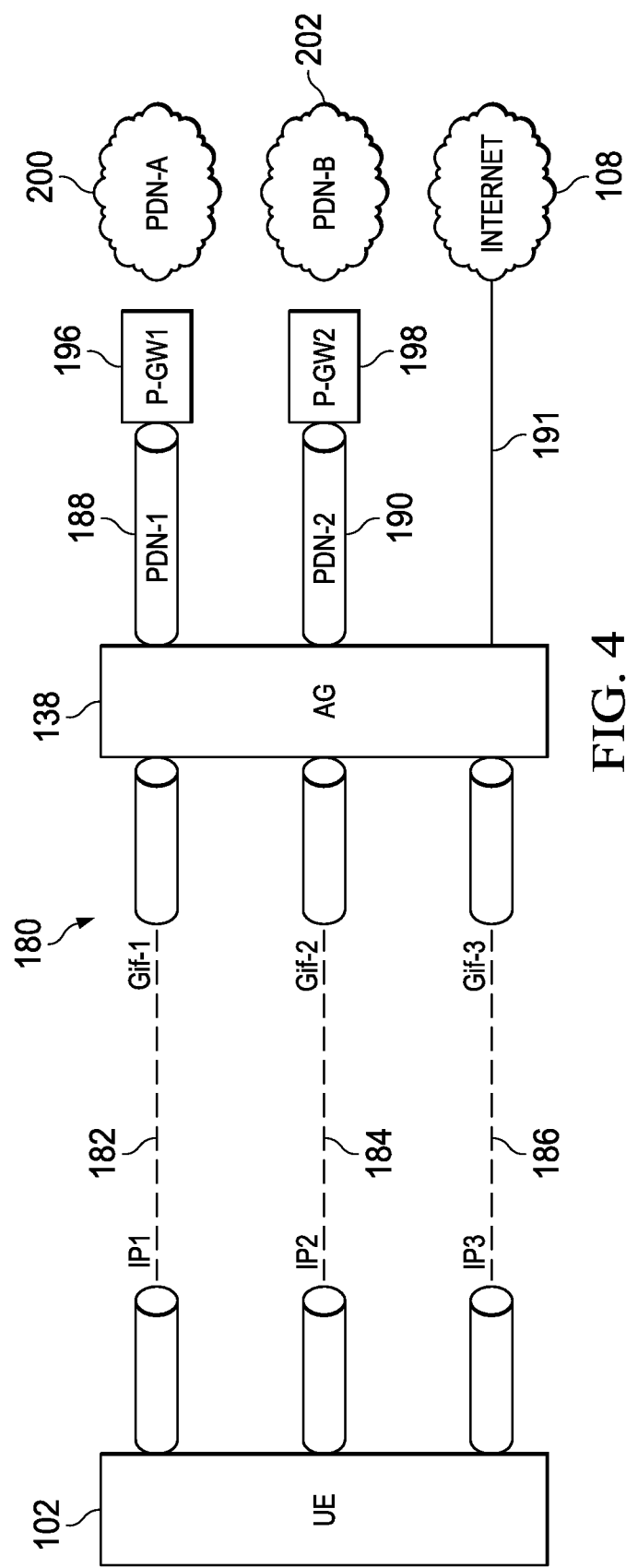
FIG. 4 illustrates an embodiment connection model for connecting multiple IP connections.

FIG. 4 illustrates connection model 180 with multiple connections. UE 102 has three connections over multiple links to AG 138 over connection 182, connection 184, and connection 186. Connections 182, 184, and 186 are associated with IP addresses IP1, IP2, and IP3 gateway interface (Gif)-1, Gif-2, and Gif-3, respectively. Gif-1, Gif-2, and Gif-3 are derived from virtual but unique MAC addresses configured in AG 138. A Gif is unique for the PDN and NSWO connections for UE 102. However, these interfaces are not unique across multiple UEs.

From AG 138, there are three corresponding connections: PDN connection 188 through PGW1 196 to PDN-A 200, PDN connection 190 through PGW2 198 to PDN-B 202, and NSWO connection 191 to internet 108.

A connection context tuple is unique with a host IP address for the connection, a host MAC address, a gateway IP interface for the connection, and a gateway MAC address for the connection. The connection is associated to a PDN/APN during connection. After a connection is established, unicast and multicast forwarding may be handled at both the router of the AG and the UE using the connection tuple.

Connections are established in two phases. Initially, bootstrapping of the APN-IP interface is performed during the authentication phase. Next, the IP interface is configured. During bootstrapping, the UE communicates its APNs to the network. In return, the network provides gateway configuration details to the UE.

Figure 5:
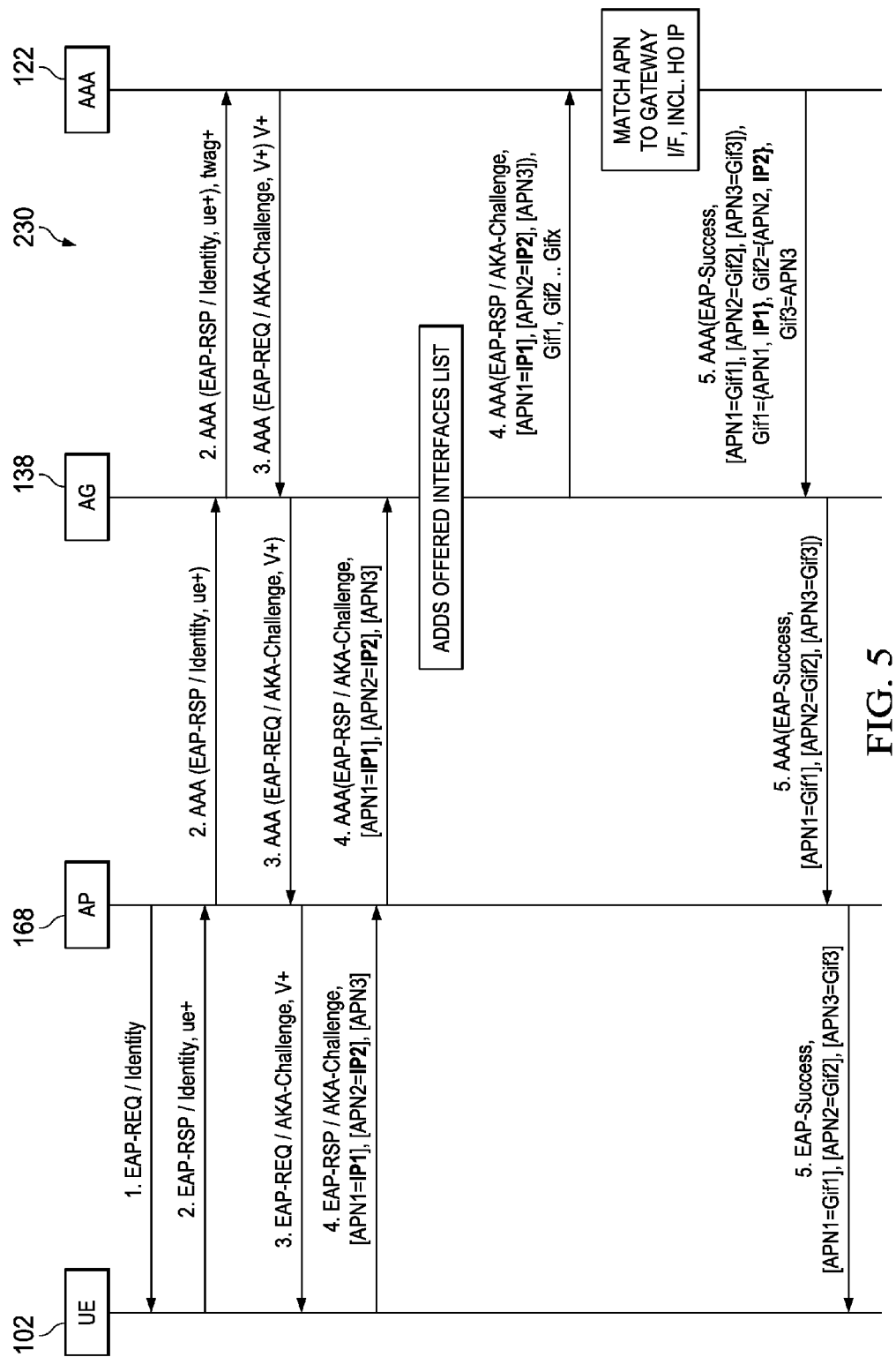
FIG. 5 illustrates an embodiment message sequence for connecting multiple IP connections.

FIG. 5 illustrates message sequence 230 for a bootstrapping APN-IP interface. Message sequence 230 illustrates messages passed between UE 102 and AP 168, between AP 168 and AG 138, and between AG 138 and AAA 122. Steps 1-3 show how UE 102 and AG 138 exchange information through AP 168 to determine which nodes are phase 2 compliant. The version used is negotiated based on the capability of UE 102 and other devices. Initially, AP 168 transmits an EAP request (EAP-REQ) with its identity (Identity) to UE 102 in step 1.

Then, in step 2, the versions of UE 102 and AG 138, along with the identity of AP 168, are transmitted to AAA 122. First, UE 102 transmits an EAP response (EAP-RSP) with its version (ue+) and the identity of AP 168 to AP 168. AP 168 then forwards the EAP-RSP containing the identity of AP 168 (Identity) and ue+ to AG 138. Next, AG 138 transmits an EAP-RSP to AAA 122 containing the identity of AP 168, ue+, and AAA message parameters containing the version of AG 138 (twag+), indicating its capability.

AAA 122 then negotiates the version, which will be used for subsequent connections. The negotiation is based on the capabilities of UE 102, AP 168, AG 138, and AAA 122. The negotiated version is supported by all the relevant devices. AAA 122 transmits an EAP-REQ with an AKA challenge and the negotiated version (V+) both as EAP-REQ and as AAA message parameters to AG 138. AG 138 stores the negotiated version in AAA message parameters, and then transmits the EAP-REQ to AP 168. AP 168 forwards the EAP-REQ to UE 102.

When UE 102 and the network are phase 2 compliant, EAP extensions are used to carry the APN and IP interface information in steps 4 and 5 to set up multiple point-to-point connections. UE 102 has a connected list and an APN list. In step 4, UE 102 transmits an EAP-RSP/AKA-Challenge with the APNs. All, some, or none of the APNs may have an associated IP address, based on whether these are re-attachments. The IP addresses are associated with APNs when the session is following handover and IP address preservation is desired. Otherwise, the IP addresses corresponding to the APNs may be set to a predetermined value, for example zero. As pictured, APN1 is associated with IP1, APN 2 is associated with IP2, and APN3 is not associated with an IP address. AP 168 forwards the EAP-RSP to AG 138. Then, AG 138, which contains an AAA adds its gateway interface list with gateway interfaces capable of associating with the APNs to the list of APNs and IP addresses. The EAP-RSP and gateway interface list in AAA parameters are transmitted to AAA 122. As pictured, the gateway interfaces of AG 138 include Gif1 through Gifx, where x is an integer.

AAA 122 associates the ANPs with the gateway interfaces, and with the IP interfaces associated with the APNs. AAA 122 transmits an EAP-Success message with the association between ANPs and Gifs both as EAP-Success and AAA message parameters to AG 138. For example, APN1 is associated with Gif1, APN2 is associated with Gif2, and APN3 is associated with Gif3. AG 138 stores the association of APNs to Gifs obtained from the AAA message parameters, and forwards the EAP-Success message to AP 168, which forwards it to UE 102.

UE 102 and AG 138 use the association information to configure the IP addresses, for example dynamic host configuration protocol (DHCP) or router solicitation router advisement (RS/RA) may be used to associate an IP interfaces to APNs.

Alternatively, the exchange of APNs and gateway interfaces may be performed using the EAP Response/Identity of step 2 and the EAP Request/AKA Challenge of step 3. In another example, the gateway MAC interfaces are associated to APNs. The IP configuration may be transmitted in a DHCP Request/Router solicitation to the MAC addresses for the PDNs. When the EAP messages are not encrypted, AG 138 may act as an AAA proxy for these extension parameters. In this case, the EAP extended message exchange is only used between UE 102, and AP, AG 138.

EAP extension parameters include flags, for example for phase 1 or 2 of UE 102 and AG 138, IPv4 and IPv6, for initial attachment, or for handover. They also include a UE PDN context, which may include a tag, a length, an APN, a UE IP address if present. Additionally, the EAP extension parameters include the gateway interface and router interface, if present.

The AAA parameters include the gateway interface or router interface. The gateway interface is an IPv4 interface of AG 138 that may be bound to an APN. Also, the gateway interface is used in DHCP signaling. The router interface is a transient multicast address that AG 138 can listen to for IPv6 router solicitation, which may also be bound to an APN.

Figure 6:
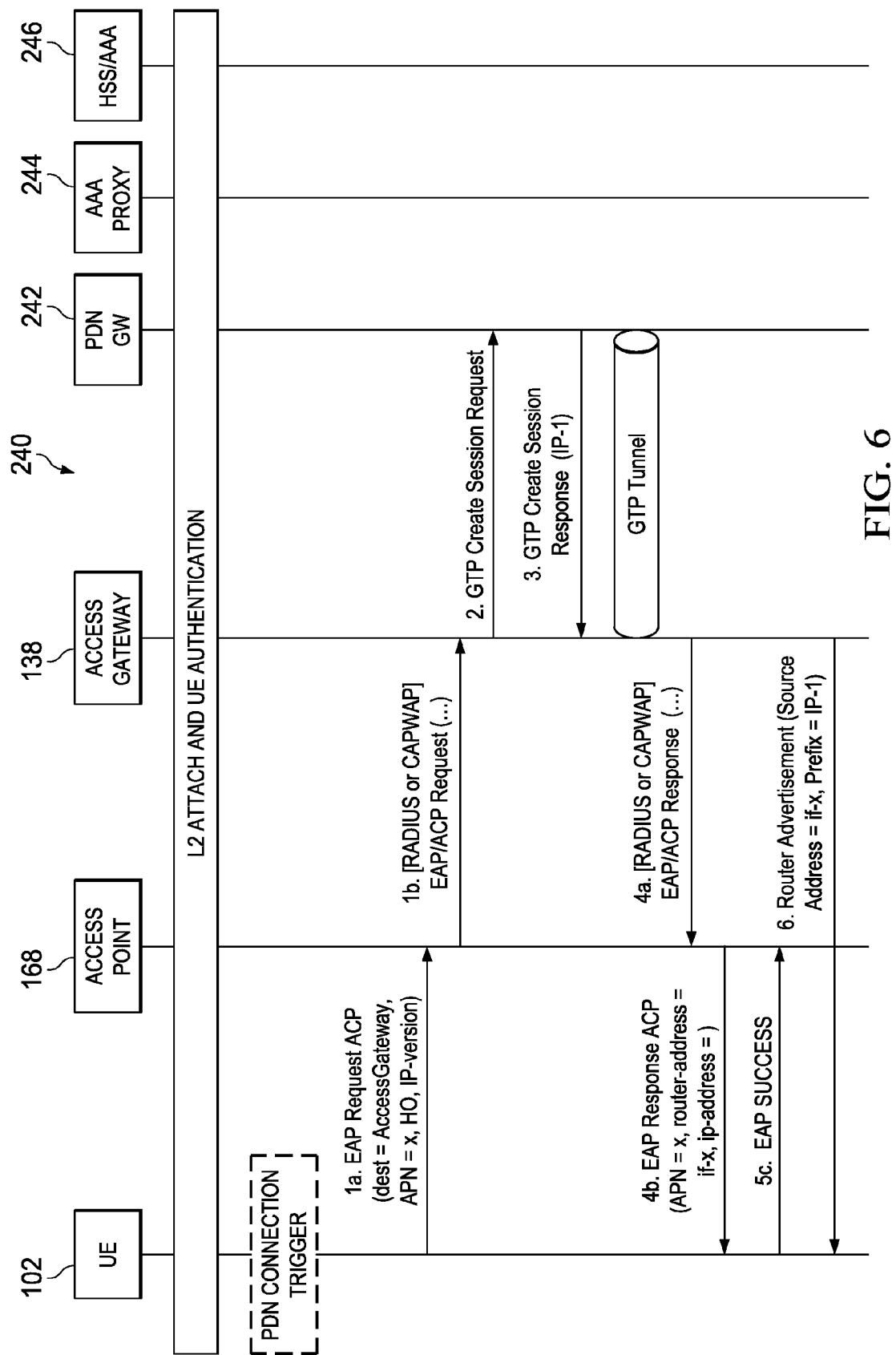
FIG. 6 illustrates another embodiment message sequence for connecting multiple IP connections.

After the authentication sequence in which the APN to IP interface information is bootstrapped, IPv4 or IPv6 interfaces may be configured. Also, individual connections may be disconnected without disturbing the other connections FIG. 6 illustrates message sequence 240, another message flow sequence for a UE in a N3GPP network to attach to a set of APNs. UE 102 exchanges messages with AP 168, which exchanges messages with AG 138. AG 138 then exchanges messages with PDN GW 242. Additionally, AAA proxy 244 and HSS/AAA 246 are pictured. An EAP method, access context protocol (ACP) is used in message sequence 240. ACP is initiated by UE 102. Message sequence 240, and the ACP, are initiated after successful authentication of UE 102. Initiation may be performed by PDN connection trigger from a user.

In step 1, an ACP initial message is sent to AG 138. The ACP initial message triggers PDN setup over GTP or PMIP. FIG. 6 shows the example using GTP. Initially, in step 1a, UE 102 transmits an EAP request ACP destined for AG 138, containing PDN connection parameters to AP 168. The PDN connection parameters may include APNs, handover status (HO), and the IP version. Next, AP 168 transmits EAP message 1b over RADIUS or CAPWAP to AG 138.

AG 138 and PDN GW 242 then configure the connection with messages 2 and 3. The EAP proxy in AG 138 transmits message 2 to the EAP application connection manager. When the EAP proxy in AG 138 receives an ACP message destined for itself, it forwards the request to the connection manager. The connection manager examines the request, and in message 2, initiates a GTP Create Session Request or a PMIP protocol binding update message to PDN GW 242 with the PDN connection parameters.

In message 3, PDN GW 242 provides a GTP Create Session Response to AG 138 with the PDN parameters and IP prefix. In one example, the IP prefix is an IPv6 prefix. In another example, the IP prefix is an IPv4 address. Then, AG 138 sets up a GTP or PMIP tunnel with PDN GW 242.

Next, in message 4, AG 138 transmits the IP prefix and configuration to UE 102 through AP 168. When AG 138 receives a GTP create session response or a PMIP protocol binding acknowledgement with an IP prefix to assign to UE 102, AG 138 encapsulates the ACP response in RADIUS or CAPWAP in message 4a, and transmits the encapsulated ACP response to AP 168. In message 4b, AP 168 transmits the ACP response to UE 102 as EAP Response ACP.

When IPv4 is used, UE 102 stores the IPv4 address information. On the other hand, when IPv6 is used, UE 102 stores the router address associated with the APN.

In message 5, UE 102 replies to AP 168 with an EAP success message to complete the EAP signaling.

Then, with message 6, router advertisement is performed. An IPv4 address or an IPv6 prefix is configured based on the IP version signaled of UE 102. For IPv6, UE 102 receives router advertisements from the router address or source address that it stored in association with the APN, where the prefix advertised is for the APN. UE 102 proceeds with neighbor discovery messages to complete the IPv6 discovery process.

A similar sequence is used for detaching a PDN connection. In an ACP detach request, the parameters of the PDN connection to be terminated are transmitted through AP 168 to AG 138. AG 138 completes signaling with PDN GW 242 to complete the detach process. Then, AG 138 informs UE 102 through AP 168 of the detachments. When IPv6 is used, AG 138 stops sending further router advertisements with the detached prefix.

Figure 7:
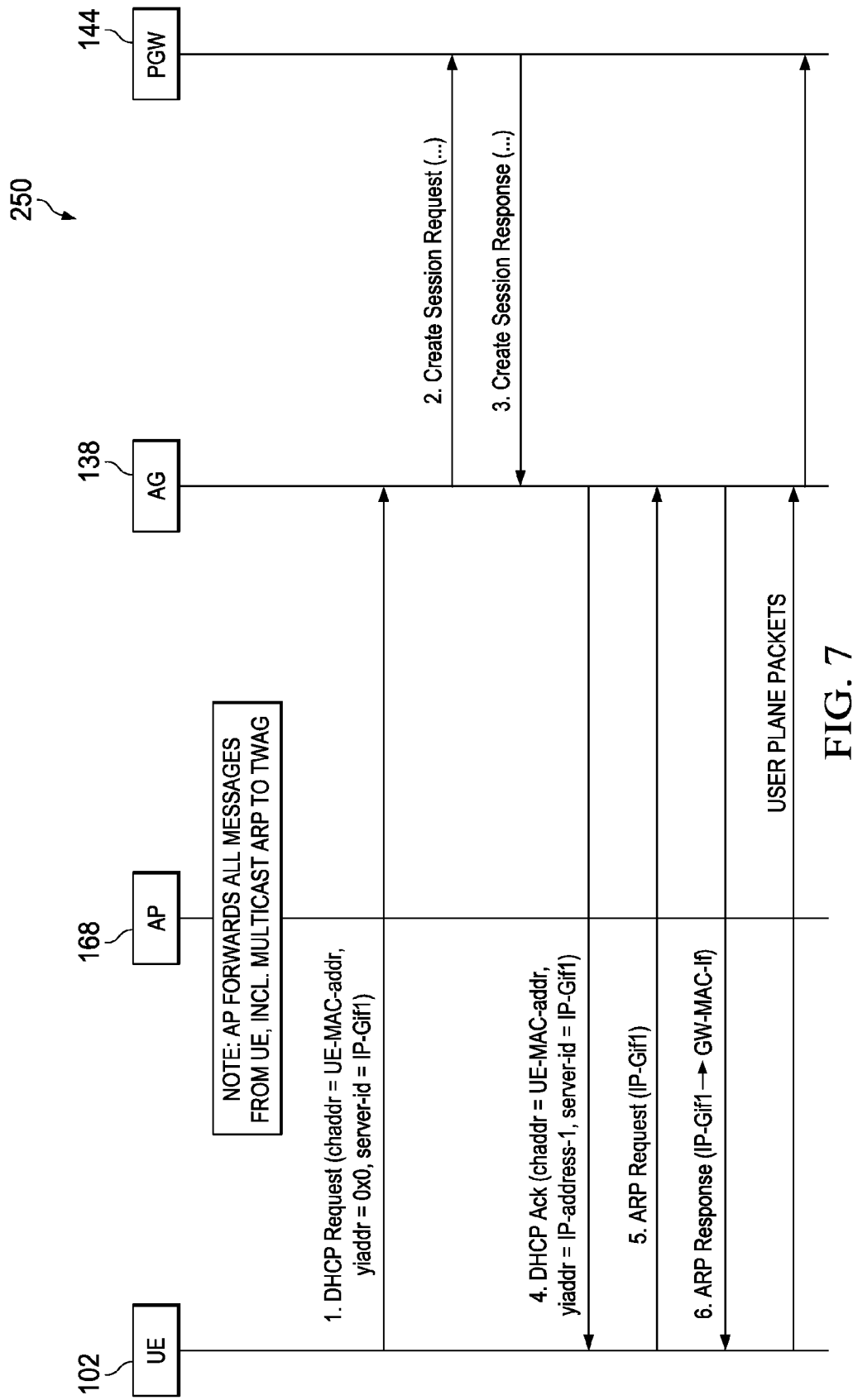
FIG. 7 illustrates an additional embodiment message sequence for configuring multiple IP connections in IP version 4 (IPv4)

FIG. 7 illustrates message sequence 250 for an IPv4 interface configuration. In message sequence 250, UE 102 communicates with AP 168, which forwards messages to AG 138. Then, AG 138 exchanges messages with PGW 144.

Following authentication, when UE 102 decides to establish an interface for an APN, UE 102 transmits a DHCP Request to AG 138 through AP 168. In the DHCP Request, the server identity is set to the IPv4 gateway interface value configured for the APN. In this example, chaddr is set to UE-MAC-addr, yiaddr is set to 0x0, and server-id is set to IP-Gif1.

AG 138 then determines the APN based on the server interface value and the MAC address of UE 102 from the DHCP Request. In step 2, AG 138 initiates a GTP Create Session Request or a PMIP Binding Update Request message to PGW 144

PGW 144 configures the IPv4 address. In this example, the IPv4 address is IP-address-1. Then, in step 3, PGW 144 transmits a GTP Create Session Response or a PMIP Binding Update Response message to AG 138.

Next, AG 138, in step 4, transmits a DHCP acknowledgement (Ack) to UE 102 through AP 168. In the DHCP Ack, yiaddr is IP-address-1, chaddr is UE-MAC-addr, and server-id is IP-Gif1. The DHCP Ack may also contain other configuration information, such as a subnet, a gateway interface, or a domain name server (DNS).

In response, UE 102 transmits an address resolution protocol (ARP) request to AG 138 through AP 168. The ARP request contains the gateway interface address (IP-Gif1 in this example).

AG 138 responds to UE 102 through AP 168 with the MAC address of the interface, GW-MAC-If in this example. The IPv4 interface is now configured and ready for transmitting user plane packets.

Figure 8:
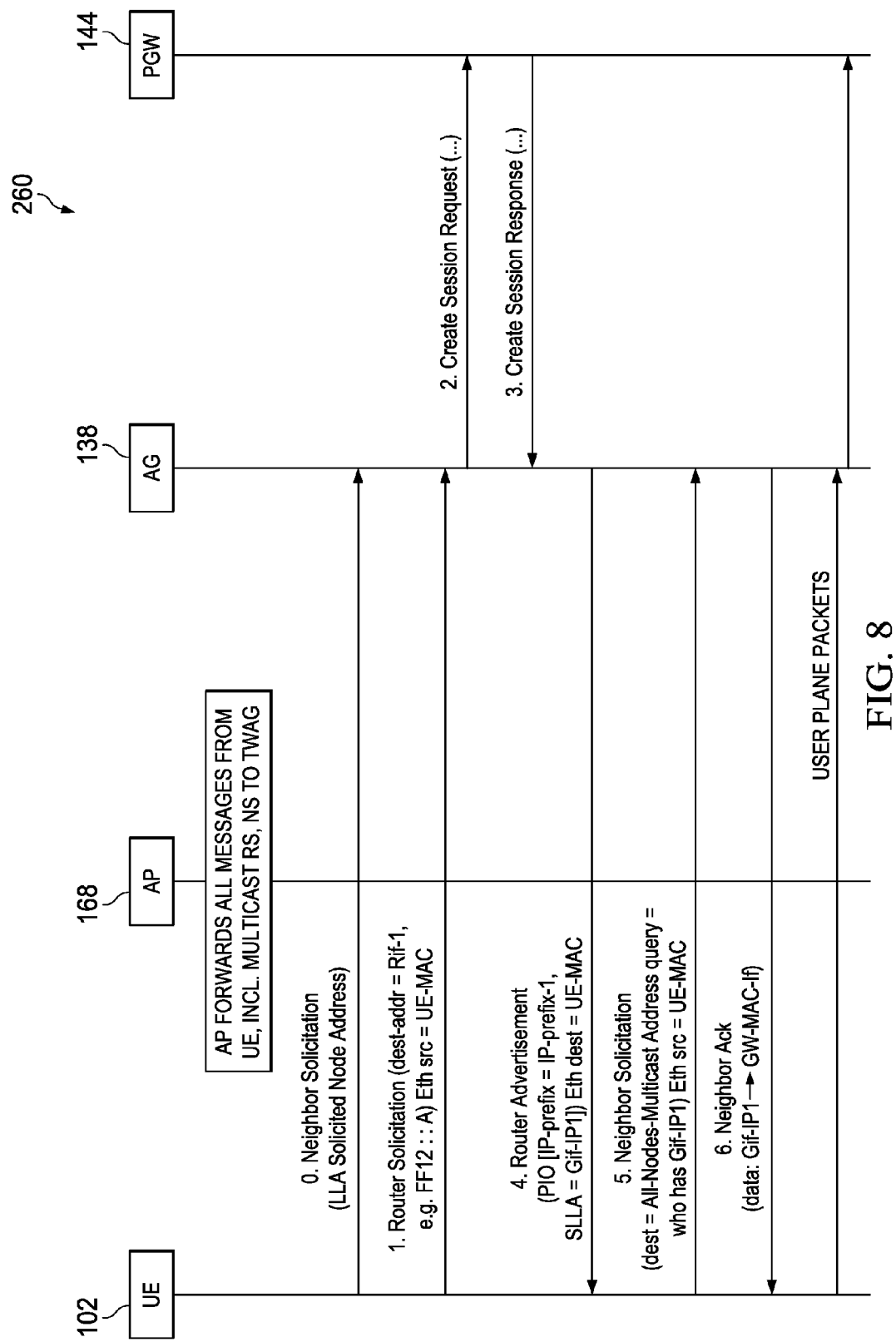
FIG. 8 illustrates another embodiment message sequence for configuring multiple IP connections in IP version 6 (IPv6)

FIG. 8 illustrates message sequence 260 for configuring an IPv6 interface. In message sequence 260, UE 102 communicates with AP 168, which forwards messages between UE 102 and AG 138. Then AG 138 exchanges messages with PGW 144.

Following authentication, the IPv6 link layer is configured. Neighbor solicitation duplicate address detection (NS DAD) is performed with a link-local address (LLA) solicited node address. Message 0 is transmitted from UE 102 to AG 138 through AP 168. No response indicates that the LLA is unique.

When UE 102 decides to establish an interface for an APN, it transmits a Router Solicitation to AG 138 through AP 168. The destination address to set the Router Solicitation is the transient multicast address that AG 138 listens to. In this example, the destination address (dest-addr) is Rif-1. As pictured, the transient multicast address, which was configured for the APN during the EAP sequence, is FF12::A. In another example, the gateway MAC address obtained during the EAP sequence is used, and the destination address in the router solicitation is All-Routers-Multicast-Address. Also, in this example, Eth src is set to UE-MAC.

AG 138 determines the APN based on the destination address value in the Router Solicitation and the MAC address of UE 102. Then, AG 138 transmits message 2 to PGW 144 with a GTP Create Session Request or a PMIP Binding Update Request message.

PGW 144 configures the IPv6 address, which is IP-address-1 in this example. Next, PGW 144 returns a GTP Create Session Response or a PMIP Binding Update Response message to AG 138 in message 3.

In message 4, AG 138 transmits a Router Advertisement to UE 102 through AP 168. The Router Advertisement includes IP-prefix-1, the gateway interface address (Gif-IP1 in this example), and other configuration information, such as the DNS. Eth dest is set to UE-MAC in this example.

In response, in message 5, UE 102 transmits a Neighbor Solicitation to AG 138 through AP 168. The neighbor solicitation includes the gateway interface address of AG 138. Eth src is set to UE-MAC. The destination (dest) is All-Nodes-Multicast-Address, and query is who has Gif-IP1.

AG 138 replies to UE 102, through AP 168, with the MAC address (GW-MAC-If) of the interface. The IPv6 interface is now configured and ready for transmitting user plane packets.

In data plane operation, once the IP interface corresponding to the APN is configured, the connection may be identified in the UE and AG by the tuple {host IP address for connection, host MAC address, gateway IP interface for connection, gateway MAC address for connection}.

For unicast upstream packets, an IP packet from UE 102 is sent to the gateway MAC address. AG 138 may identify the connection or PDN uniquely based on the combination {source IP address, gateway MAC address}. For unicast downstream packets, AG 138 sends packets from the gateway MAC address corresponding to the PDN. UE 102 identifies the PDN uniquely based on {destination IP address, gateway MAC address}.

Figure 9:
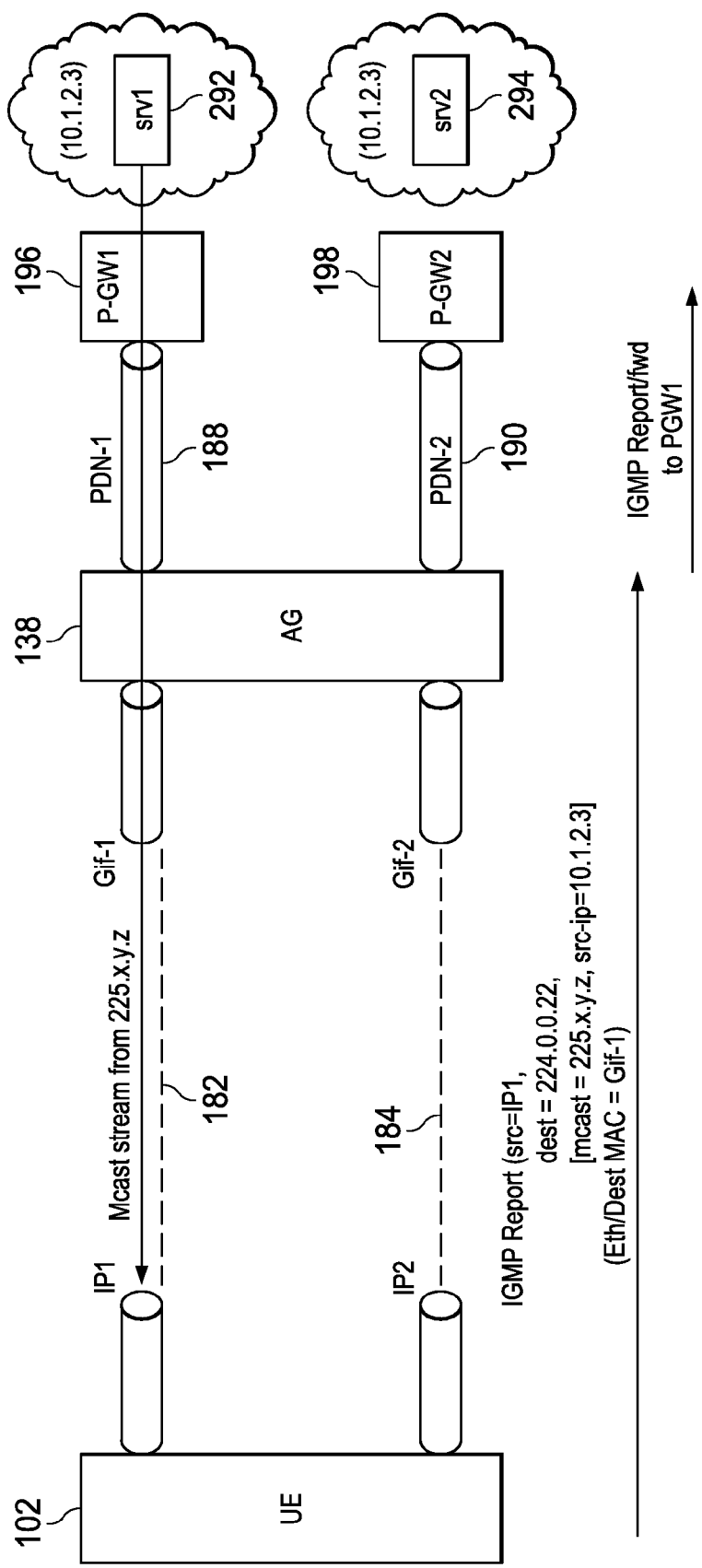
FIG. 9 illustrates an embodiment connection model for multicast session establishment.

For multicast operations, UE 102 is generally the first to subscribe to the multicast stream. FIG. 9 illustrates UE 102 subscribing to a multicast stream. A message internet group management protocol (IGMP) report is sent from UE 102 to the multicast address 224.0.0.22, and the Ethernet or MAC destination address is sent to the gateway interface address corresponding to the APN/PDN. AG 138 then forwards the IGMP report to the appropriate PDN based on {source IP address, gateway MAC address}.

Once UE 102 has subscribed to the multicast stream, the PDN gateway, for example PGW1 196, forwards a packet downstream in a corresponding GTP/PMIP tunnel to srv1 292. Also, PGW2 198 forwards the packet downstream in a corresponding GTP or PMIP tunnel to srv2 294. AG 138 determines the destination based on the PDN connection, not the IP destination address. AG 138 uses the incoming PDN connection to forward on the gateway interface, for example MAC=Gif1, to UE 102. Then, UE 102 uniquely identifies the PDN of the packet. Multicast listener discovery (MLD) based multicast in IPv6 operates in a similar manner.

To release a single IP connection out of multiple connections to UE 102, there is no dedicated signaling. In an example, the status of the connections is monitored using internet control message protocol (ICMP) Echo to determine if a connection is alive or not.

Figure 10:
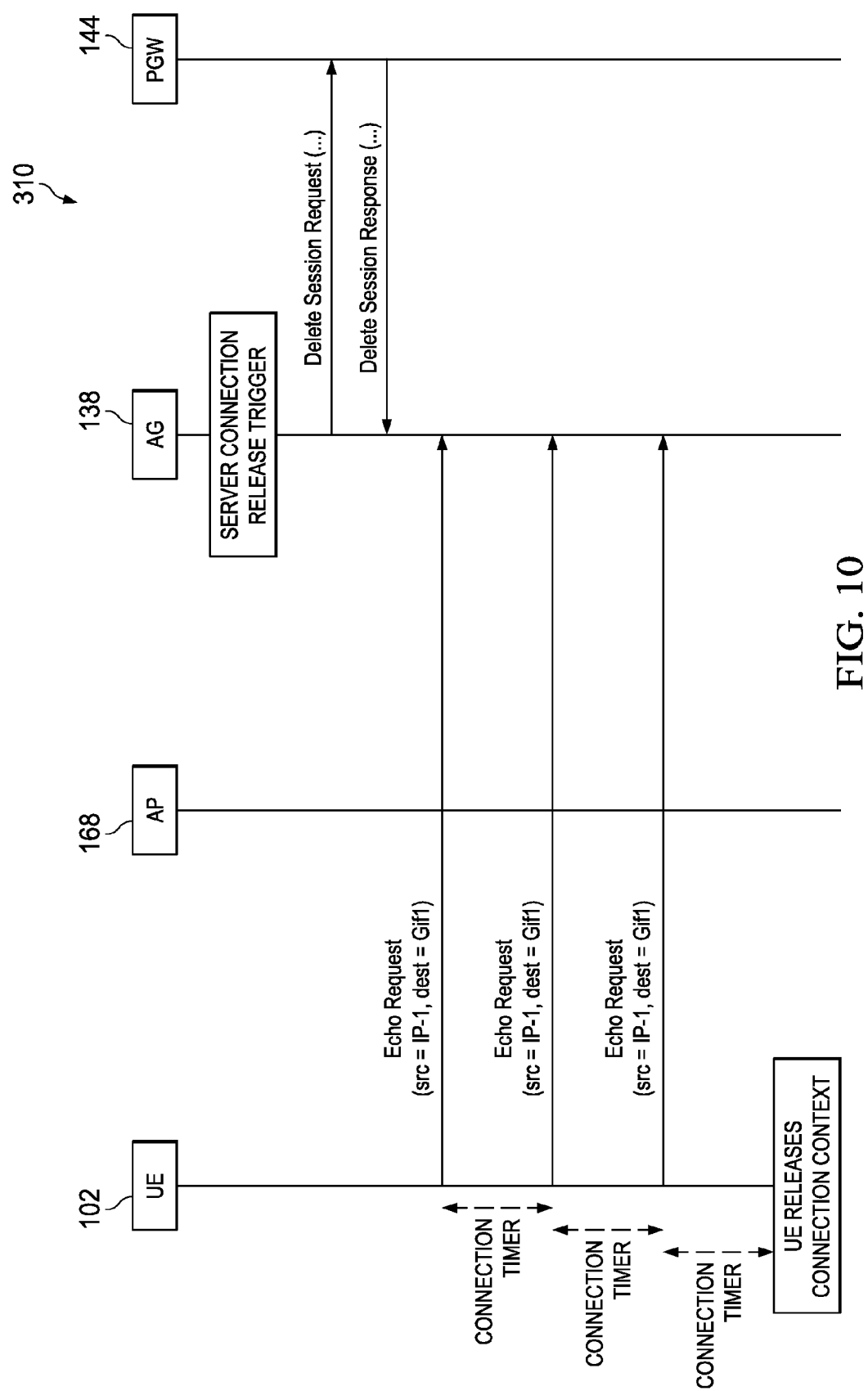
FIG. 10 illustrates an embodiment message sequence for disconnecting one of multiple IP connections.

FIG. 10 illustrates message sequence 300 for a server initiated connection releases of one of multiple connections. Examples of server initiated connection releases include HSS or operator decisions to terminate a connection, which acts as the trigger release. UE 102 communicates with AG 138 through AP 168, and AG 138 communicates with PGW 144.

After the connection release trigger, AG 138 transmits a Delete Session Request to PGW 144. PGW 144 responds with a Delete Session Response. The session is deleted from PGW 144. AG 138 clears the configuration for the PDN.

Then, UE 102 transmits an Echo Request to AG 138 through AP 168. In an example, src is IP-1 and dest is Gif1. Upon the expiration of the connection timer, UE 102 polls AG 138 for connection status. If there is no reply, UE 102 repeats the Echo Request. In an example, the Echo Request is transmitted three times. If there is no response after a present number of Echo Requests are sent, UE 102 determines that the connection has been released, and removes the connection context.

Figure 11:
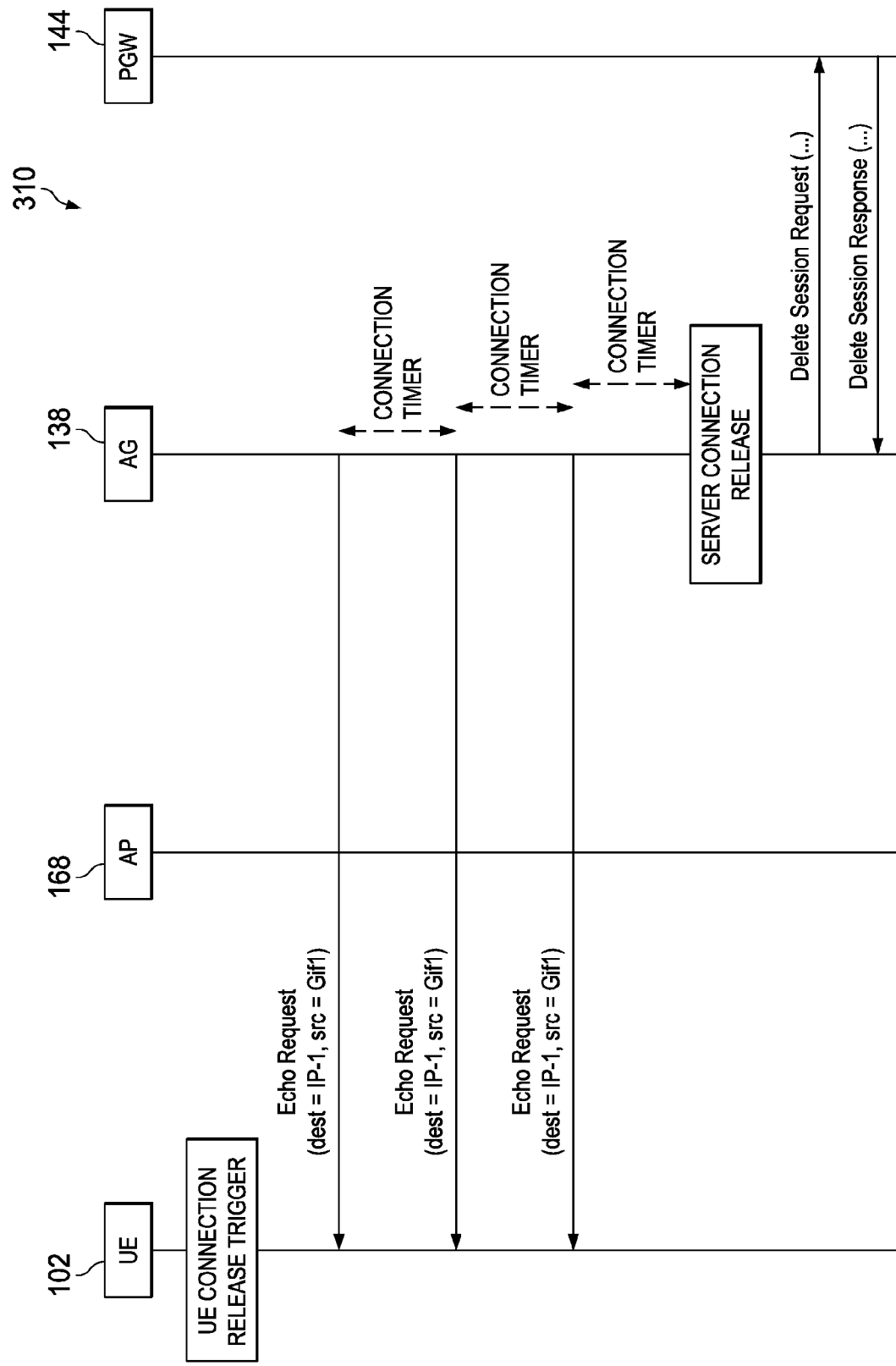
FIG. 11 illustrates another embodiment message sequence for disconnecting one of multiple IP connections.

FIG. 11 illustrates message sequence 310 for UE 102 initiating a connection release of one connection while maintaining other active connections. UE 102 communicates with AG 138 through AP 168. Also, AG 138 communicates with PGW 144. Initially, UE 102 receives a trigger to close the connection, for example when an application is closed. Upon receiving the trigger, UE 102 releases its local connection context.

AG 138 polls for a connection status using ICMP Echo. After the expiration of a connection timer, AG 138 polls the connection again. If there is no response after a predetermined number of echo requests, for example three, AG 138 determines that the connection has been released. AG 138 then transmits a Delete Session Request to PGW 144 and releases its local connection. PGW 144 responds with a Delete Session Response.

When user data is sent on that connection, the connection timers are reset, reducing the amount of monitor signaling by only considering times of silence. In an example, the UE connection timer is significantly less than that of the AG. This enables the UE to check frequently with a lower load on the AG.

When IPv6 is used, neighbor unreachability detection (NUD) may be used instead of ICMP Echo, because the UE and AG are a single router hop away.

Figure 12:
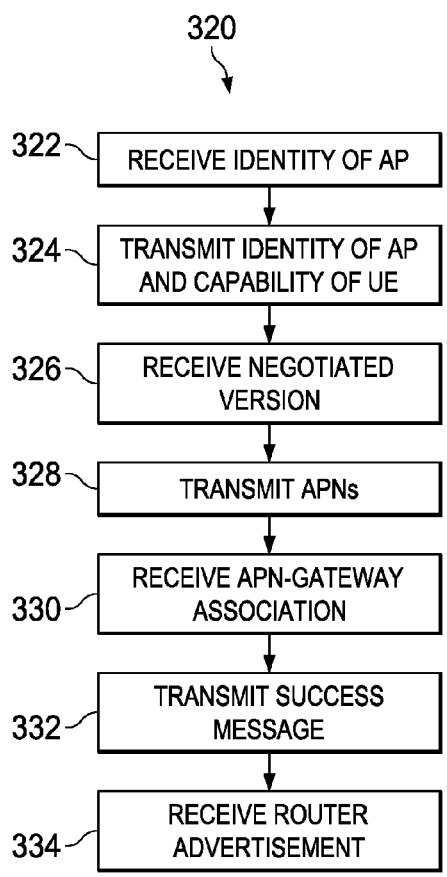
FIG. 12 illustrates a flowchart for an embodiment method of connecting multiple IP interfaces.

FIG. 12 illustrates flowchart 320 for a method of configuring multiple IP interfaces by a UE. Initially, in step 322, the UE receives, from an AP, the identity of that AP. The identity of the AP is received in an EAP message from the AP, for example an EAP-REQ message.

In response, in step 324, the UE replies to the AP by transmitting a message with the identity of the AP and the UE's capability of the UE. The capability of the UE indicates whether the UE is capable of multiple connections or only single connections. The message is an EAP message, for example EAP-RSP.

After additional communications between the AP, an AG, and an AAA, the UE, in step 326, receives a message containing a negotiated connection version. The negotiated connection version is a connection version supported by the UE, the AP, the AG, and the AAA. The received message is an EAP message, such as an EAP-REQ message or an AKA-Challenge.

To initiate multiple connections, the UE transmits a message with APNs in step 328. All, none, or some of the APNs may be associated with IP addresses. For the APNs that are not associated with IP addresses, an associated IP address may be set to a default value, for example zero. The message may also contain the HO. In on example, the message containing the APNs is an EAP RSP or an AKA Challenge. In another example, the message is an EAP Request ACP. This message is transmitted to the AP, destined for the AG.

Next, in step 330, the UE receives a message containing an association between the APNs and the gateway interfaces or router addresses. This message may also contain the associated AP addresses. In one example, the received message is an EAP-Success message, and the connections are configured. In another example, the received message is an EAP Response ACP message.

In one example, the UE transmits an EAP success message to the AP in step 332. Then, in step 334, the UE receives a router advertisement containing the source address and prefix from the AG through the AP.

Figure 13:
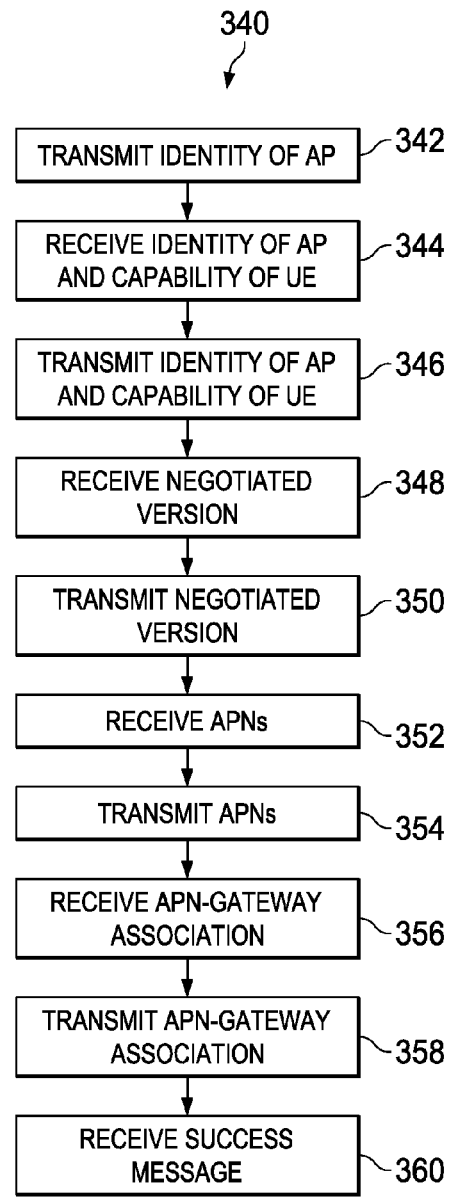
FIG. 13 illustrates another flowchart for an embodiment method of connecting multiple IP interfaces.

FIG. 13 illustrates flowchart 340 for a method of configuring multiple IP connections by an AP. Initially, in step 342, the AP transmits its identity to a UE in an EAP message, for example in an EAP-REQ message.

Then, in step 344, the AP receives an EAP message from the UE containing the identity of the AP and the capability of the UE. The UE may be capable of configuring multiple connections, or only a single connection. In one example, the received message is an EAP-RSP message.

Next, in step 346, the AP transmits an EAP message containing the identity of the AP and the capability of the UE to an AG. In one example, the EAP message is an EAP-RSP message.

In step 348, the AP receives an EAP message with the negotiated connection version from the AG. The negotiated connection version is a connection version that the UE, the AP, the AG, and the AAA are capable of. In one example, the received message is an EAP-REQ.

Then, in step 350, the AP transmits the negotiated connection version to the UE in an EAP message. For example, the message may be an EAP-RSP.

When the UE attempts to configure connections, the AP receives an EAP message containing APNs from the UE in step 352. Some, none, or all of the APNs may have IP addresses associated with them. The EAP message may also contain the HO. In one example, the received EAP message is an EAP-RSP. In another example, the received EAP message is an EAP Request ACP.

Then, in step 354, the AP forwards an EAP message containing the APNs and other information in step 354. In one example, an EAP-RSP is transmitted to the AG. In another example, a RADIUS or CAPWAP EAP/ACP message is transmitted.

Later, in step 356, the AP receives an EAP message with the association between APNs and gateway interfaces from the AG. In one example, the received message is an EAP-Success. In another example, the received message is a RADIUS or CAPWAP EAP/ACP Response.

The AP forwards an EAP message with the association to the UE in step 358. In one example, an EAP-Success message is transmitted to the UE. In another example, an EAP Response ACP message is forwarded to the UE. In the latter example, the AP then receives an EAP success message from the UE in step 360.

FIG. 14 illustrates flowchart 370 for a method of configuring multiple IP connections by an AG. Initially, in step 372, the AG receives, from an AP, an EAP message containing the identity of the AP and the capability of a UE from the AP. The capability of the UE indicates whether the UE is capable of multiple connections or only a single connection. In one example, the received EAP message is an EAP-RSP.

Then, in step 374, the AG transmits an EAP message with the identity of the AP, the capability of the UE, and the capability of the AG to the AAA. In one example, the transmitted message is an EAP-RSP.

Next, the AG receives an EAP message containing the negotiated connection version in step 376. The negotiated version is an agreed upon version that the devices are capable of. In one example, the received message is an EAP-REQ.

In response, the AG transmits an EAP message containing the negotiate version in step 378 to the AP, destined for the UE. In one example, the transmitted message is an EAP-REQ.

In step 380, the AG receives an EAP message from the AP that contains the APNs of the UE. The message may also contain IP addresses associated with the APNs and an HO. In one example, the received EAP message is an EAP-RSP. In another example the received message is a RADIUS or CAPWAP message, for example an EAP/ACP request.

Then, in step 382, the AG forwards an EAP message with the APNs to the AAA or to a PDN GW. In one example, an EAP-RSP or is transmitted to an AAA. In another example, a GTP Create Session Request message or PMIP message is transmitted to a PDN GW.

In step 384, the AG receives an EAP message containing the association between the APNs and the gateway interfaces from the AAA or PGD GW. For example, an AAA EAP-Success message containing an association between the APNs, the gateway interfaces, and optionally IP addresses associated with the APNs is received from the AAA. In another example, a GTM Create Session Response is received from the PDN GW. In the later example, a GTP tunnel is created between the AG and the PDN GW. Alternatively, a PMIP message is received, and a PMIP tunnel is created.

Then, in step 386, the AP forwards an EAP message with the APN-gateway interface association to the AP, destined for the UE. In one example, an EAP-Success, is transmitted to the AP. In another example, a RADIUS or CAPWAP message, such as an EAP/ACP Response, is transmitted to the AP.

The AP may optionally transmit a router advertisement containing a source address and prefix to the UE in step 388.

FIG. 15 illustrates flowchart 390 for a method of configuring multiple IP connections by an AAA. Initially, in step 392, the AAA receives an EAP message with the identity of an AP, the capability of a UE, and the capability of an AG from the AG. The received message may be an EAP-RSP message.

In response, the AAA transmits a negotiated connection version to the AP in step 394. The negotiated version is based on the capabilities of the UE, the AP, the AG, and the AAA. For example, for multiple connections, the UE, AP, AG, and AAA should all be capable of multiple connections. The transmitted EAP message is an EAP-REQ containing the negotiated connection version.

In step 396, the AAA receives an EAP message containing the APNs, and optionally, the IP addresses associated with the APNs from the AG. The AAA also receives the gateway interfaces. In an example, the received EAP message is an EAP-RSP message.

Then, in step 398, the AAA responds with an EAP message with the association between the APNs and the gateway interfaces. The AAA matches the APNs with the gateway interfaces, including the HO IP. The transmitted EAP message may be an EAP-Success message that is transmitted to the AG.

Figure 16:
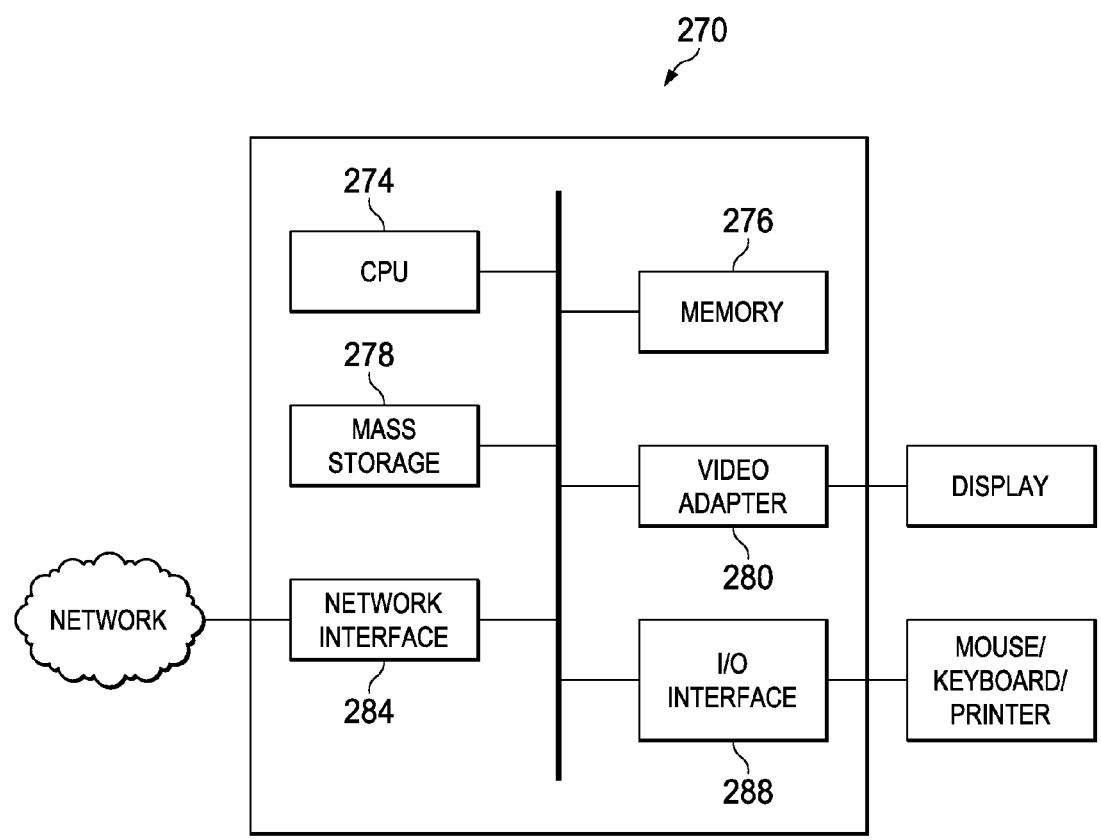
FIG. 16 illustrates a block diagram of an embodiment of a general-purpose computer system.

FIG. 16 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of configuring multiple per user access connections, the method comprising:
  receiving, by an access gateway (AG) from an access point (AP), a first extensible authentication protocol (EAP) message comprising a first capability of a user equipment (UE);
  transmitting, by the AG to an authentication, authorization and accounting (AAA) server, a second EAP message comprising the first capability of the UE and a second capability of the AG;
  receiving, by the AG from the AAA server, a first AAA message comprising a negotiated connection capability version, wherein the second capability of the AG supports the negotiated connection capability version;
  transmitting, by AG to the AP, a third EAP message comprising the negotiated connection capability version;
  receiving, by the AG from the AP, a fourth EAP message comprising a first access point name (APN) and a second APN; and
  transmitting, by the AG to the AAA server, a second AAA message comprising the first APN, the second APN, a first gateway interface, and a second gateway interface.

2. The method of claim 1, wherein the first APN is associated with a first internet protocol (IP) address.

3. The method of claim 1, further comprising:
  receiving, by the AG from the AAA server, a third AAA message comprising a first association between the first APN and the first gateway interface, a second association between the second APN and the second gateway interface, and AAA message parameters; and transmitting, by the AG to the AP, a fifth EAP message comprising the first association between the first APN and the first gateway interface, and the second association between the second APN and the second gateway interface.

4. The method of claim 3, wherein the fourth EAP message is an EAP-Response, the second AAA message is an EAP-Response, the third AAA message is an EAP-Success, and the fifth EAP message is an EAP-Success.

5. The method of claim 3, wherein the second AAA message is a general packet radio service (GPRS) tunneling protocol (GTP) Create Session Request and the third AAA message is a GTP Create Session Response.

6. The method of claim 1, further comprising initiating a release of a first connection between the first APN and the first gateway interface.

7. The method of claim 1, further comprising:
transmitting, by the AG to the AP, a first echo request; and
releasing a first connection between the first APN and the first gateway interface.

8. The method of claim 1, wherein the first EAP message is an EAP-Response, the second EAP message is an EAP-Response, the first AAA message is an EAP-Request, and the third EAP message is an EAP-Request.

9. The method of claim 1, wherein the first EAP message further comprises an identity of the AP, and wherein the second EAP message further comprises the identity of the AP.

10. The method of claim 1, wherein the AG comprises an EAP proxy.

11. A method of configuring multiple per user connections, the method comprising:
transmitting, by a user equipment (UE) to an access point (AP), a first extensible authentication protocol (EAP) message destined for an AG, wherein the first EAP message comprises a first plurality of access point names (APNs) comprising a first APN and a second APN;
receiving, by the UE from the AP, a second EAP message comprising an association between the first plurality of APNs and a second plurality of gateway interfaces, wherein the second plurality of gateway interfaces comprises a first gateway interface and a second gateway interface, wherein the first APN is associated with the first gateway interface, and wherein the second APN is associated with the second gateway interface; and
determining a third plurality of router interface addresses in accordance with the second EAP message.

12. The method of claim 11, further comprising:
transmitting, by the UE to the AP, a third EAP message comprising a capability of the UE; and
receiving, by the UE from the AP, a fourth EAP message comprising a negotiated connection version.

13. The method of claim 12, further comprising receiving, by the UE from the AP, a fifth EAP message comprising an identity of the AP.

14. The method of claim 11, wherein the first EAP message is an EAP request with an access context protocol (ACP), and wherein the second EAP message is an EAP Response ACP.

15. The method of claim 14, further comprising:
transmitting, by the UE to the AP, an EAP Success Message; and receiving, by the UE from the AP, a Router Advertisement.

16. The method of claim 11, wherein the first EAP message further comprises an IP version.

17. The method of claim 16, wherein the IP version is IP version 4 (IPv4).

18. The method of claim 16, wherein the IP version is IP version 6 (IPv6).

19. The method of claim 11, further comprising:
transmitting, by the UE to the AP, destined for the AG, a first echo request;
transmitting, by the UE to the AP, destined for the AG, a second echo request when the UE does not receive a response from the AP within a first time interval of transmitting the first echo request; and
releasing a connection context when the UE does not receive a response from the AP within a second time interval of transmitting the second echo request.

20. An access gateway (AG) comprising:
a processor; and
a computer readable storage medium storing programming for execution by the processor, the programming including instructions to
receive, from an access point (AP), a first extensible authentication protocol (EAP) message comprising a first capability of a user equipment (UE),
transmit, to an authentication, authorization and accounting (AAA) server, a second EAP message comprising the first capability of the UE and a second capability of the AG,
receive, from the AAA server, an AAA message comprising a negotiated connection capability version, wherein the second capability of the AG supports the negotiated connection capability version,
transmit, to the AP, a third EAP message comprising the negotiated connection capability version,
receive, from the AP, a fourth EAP message comprising a first access point name (APN) and a second APN, and
transmit, to the AAA server, a second AAA message comprising the first APN, the second APN, a first gateway interface, and a second gateway interface.

21. A user equipment (UE) comprising:
a processor; and
a computer readable storage medium storing programming for execution by the processor, the programming including instructions to
transmit, to an access point (AP), a first extensible authentication protocol (EAP) message destined for an AG, wherein the first EAP message comprises a first plurality of access point names (APNs) comprising a first APN and a second APN,
receive, from the AP, a second EAP message comprising an association between the first plurality of APNs and a second plurality of gateway interfaces, wherein the second plurality of gateway interfaces comprises a first gateway interface and a second gateway interface, wherein the first APN is associated with the first gateway interface, and wherein the second APN is associated with the second gateway interface, and
determine a third plurality of router interface addresses in accordance with the second EAP message.

* * * * *